United States Patent [19]

Baji et al.

[11] Patent Number: 4,825,287
[45] Date of Patent: Apr. 25, 1989

[54] DIGITAL VIDEO SIGNAL PROCESSOR

[75] Inventors: Toru Baji, Kodaira; Tatsuji Matsuura, Kokubunji; Toshiro Tsukada, Hachioji; Shinya Ohba, Kanagawa, all of Japan

[73] Assignee: Hitachi, Ltd., Tokyo, Japan

[21] Appl. No.: 63,476

[22] Filed: Jun. 18, 1987

[30] Foreign Application Priority Data

Jun. 20, 1986 [JP] Japan .................................. 61-142998
Jul. 11, 1986 [JP] Japan .................................. 61-161843
Aug. 15, 1986 [JP] Japan .................................. 61-190519

[51] Int. Cl.$^4$ ............................................. H04N 5/14
[52] U.S. Cl. ....................................... 358/160; 358/105
[58] Field of Search ...................... 358/160, 22, 11, 12, 358/140, 141, 183, 105

[56] References Cited

PUBLICATIONS

IEEE International Solid-State Circuits Conference, Digest of Technical Papers; "A Micro-Programmable Realtime Image Processor"; Mori et al.; Feb. 20, 1986; pp. 144–145.
IEEE International Solid-State Circuits Conference, Digest of Technical Papers; "An Image Signal Processor"; Fukushima et al.; Feb. 25, 1983; pp. 258–259.

Primary Examiner—James J. Groody
Assistant Examiner—Michael D. Parker
Attorney, Agent, or Firm—Antonelli, Terry & Wands

[57] ABSTRACT

According to the present invention, the number of elements of a signal processing circuit or the like can be drastically reduced by conducting a time-multiplex processing. In a transversal filter having a coefficient of symmetry of 16 taps, for example, the prior art requires about 58,000 transistors. In case four signal processing cores (i.e., SPC) having a function of four taps are used, the number of transistors required can be reduced to about 34,000 by a duplexing process. In case two SPCs having a function of eight taps are used, the number can be reduced to about 19,000 by a quadplexing process. In case, moreover, one SPC having a function of sixteen taps is used, the number can be reduced to about 13,000 by an octaplexing process. Here, the reason why the number of elements is not halved even if the number of the SPCs is halved is that the number of elements to be used in control circuits, memories and so on increases.

4 Claims, 16 Drawing Sheets

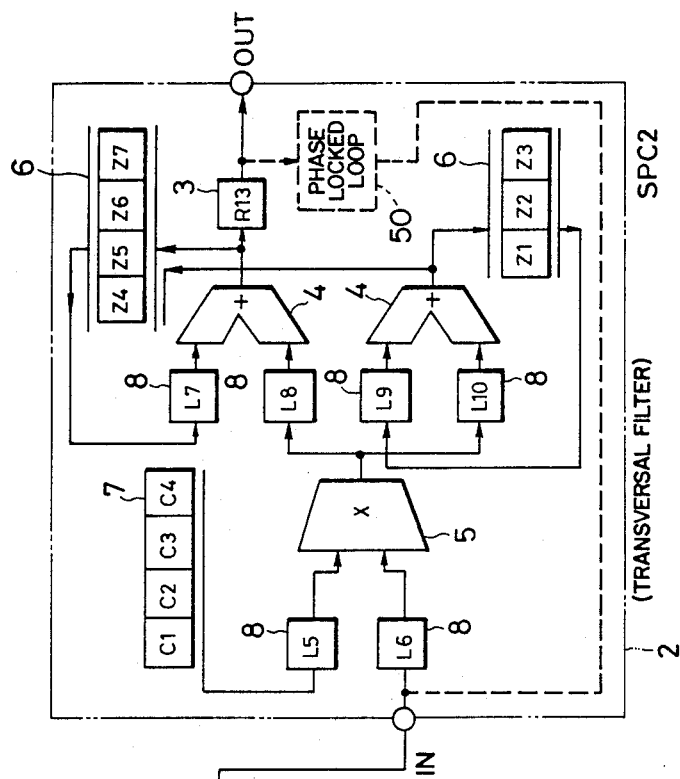
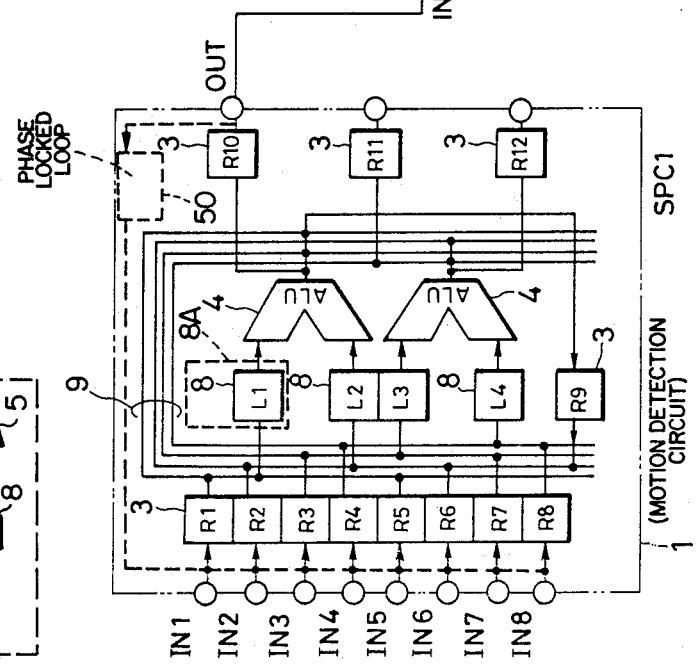
FIG. 1
FIG. 1A

FIG. 3

| Program Step | Inputs to Registers R1–R8 | Data transfers from Registers R1–R8 to Latches L1–L4 | Data transfers from ALU's 4 to Latches L1–L4 and to Registers R1–R8 |
|---|---|---|---|
| 1 | R1=IN1, R2=IN2, R3=IN3, R4=IN4<br>R5=IN5, R6=IN6, R7=IN7, R8=IN8 | | $L1=\dfrac{L1+L2}{2}$   $L2=\dfrac{L3+L4}{2}$<br>$L3=\dfrac{L1+L2}{2}$   $L4=\dfrac{L3+L4}{2}$ |
| 2 | | L1=R1, L2=R2<br>L3=R3, L4=R4 | $R9=\dfrac{L1+L2}{2}$   $R12=\dfrac{L3-L4}{2}$ |
| 3 | | | $L1=\dfrac{L1+L2}{2}$   $L2=\dfrac{L3+L4}{2}$<br>$L3=\dfrac{L1+L2}{2}$   $L4=\dfrac{L3+L4}{2}$ |
| 4 | | | $L1=\dfrac{L1+L2}{2}$   $L2=R9$<br>$R11=\dfrac{L3-L4}{2}$ |
| 5 | | L1=R5, L2=R6<br>L3=R7, L4=R8 | $R10=L1+L2$ |
| 6 | R1=IN1, R2=IN2, R3=IN3, R4=IN4<br>R5=IN5, R6=IN6, R7=IN7, R8=IN8 | | $L1=\dfrac{L1+L2}{2}$   $L2=\dfrac{L3+L4}{2}$<br>$L3=\dfrac{L1+L2}{2}$   $L4=\dfrac{L3+L4}{2}$ |
| 7 | | L1=R1, L2=R2<br>L3=R3, L4=R4 | $R9=\dfrac{L1+L2}{2}$   $R12=\dfrac{L3-L4}{2}$ |

↑ 1-SAMPLING PERIOD

FIG. 4

| PROGRAM STEP (i-SAMPLING PERIOD) | INPUTS TO LATCH L6 | INPUTS TO LATCH L5 | DATA TRANSFERS FROM MULTIPLIER 5 TO LATCHES L8 & L10, FROM DELAY 6 TO LATCHES L7 & L9 | DATA TRANSFERS FROM ALU'S 4 TO REGISTERS R13 & MEMORIES Z1-Z7 |
|---|---|---|---|---|
| 1 | L6 = IN | L5 = C1 | NOP | Z5 = L7 + L8<br>Z4 = L9 + L10 |
| 2 |  | L5 = C2 | L8 = L6 * L5, L7 = Z7<br>L10 = L6 * L5, L9 = φ | NOP |
| 3 |  | L5 = C3 | L8 = L6 * L5, L7 = Z6<br>L10 = L6 * L5, L9 = Z1 | R13 = L7 + L8<br>Z1 = L9 + L10 |
| 4 |  | L5 = C4 | L8 = L6 * L5, L7 = Z5<br>L10 = L6 * L5, L9 = Z2 | R7 = L7 + L8<br>Z2 = L9 + L10 |
| 5 | NOP | NOP | L8 = L6 * L5, L7 = Z4<br>L10 = L6 * L5, L9 = Z3 | Z6 = L7 + L8<br>Z3 = L9 + L10 |
| 6 | L6 = IN | L5 = C1 | NOP | Z5 = L7 + L8<br>Z4 = L9 + L10 |
| 7 |  | L5 = C2 | L8 = L6 * L5, L7 = Z7<br>L10 = L6 * L5, L9 = φ | NOP |

| PROGRAM STEP | | INPUTS TO REGISTER RN AND LATCHES L5-L6 | DATA TRANSFERS FROM MULT. 5 TO LATCH L8 FROM MEMORIES Z1-Z4 TO LATCH L7 AND INPUTS TO LATCH L10 | | | DATA TRANSFERS FROM ALU 4 TO REG. & MEM. R13 & Z1-Z4 | |
|---|---|---|---|---|---|---|---|
| t1 | 1 | L6=IN | | | | | |
| | 2 | RN=IN L5=C'1 | L8=L6*L5 | L7=Z3 | L10=DR | Z3=L8+L7 | Z2=L8+L10 |
| t2 | 3 | L5=C'2 | L8=L6*L5 | L7=D | | R13=L8+L7 | |
| t3 | 1 | L5=C'3 | L8=L6*L5 | L7=Z1 | L10=Z2 | Z4=L8+L10 | |
| t4 | 2 | RN=IN L5=C'1 | L8=L5*L5' | L10=DR | | | |
| t5 | 3 | L5=C'2 | L8=L6*L5' | L7=Z3 | | Z3=L8+L7 | Z2=L8+L10 |
| t6 | 1 | L5=C'3 | L8=L6*L5' | L7=D | L10=Z2 | R13=L8+L7 | Z4=L8+L10 |
| t7 | 2 | RN=IN L5=C'1 | L8=L6*L5' | L7=Z1 | L10=Z4 | Z1=L8+L7 | R14=L8+L10 |
| t8 | 3 | L5=C'2 | L8=L6*L5' | L7=Z3 | L10=DR | Z3=L8+L7 | Z2=L8+L10 |
| | | | | | | R13=L8+L7 | Z4=L8+L10 |

I-SAMPLING PERIOD (t5-t8)

FIG. 13B

DIGITAL VIDEO SIGNAL PROCESSOR

BACKGROUND OF THE INVENTION

The present invention relates to a circuit of a digital video signal processor and, more particularly, to a circuit of a digital video signal processor to be used in a high definition digital TV system, video CODEC's for telecommunication or the like.

In high definition digital TV systems, 3-dimensional filters with inter/intraframe processing are used as filters for separating illuminance and chrominance from composite video signals such as NTSC or PAL, in place of a band-pass filter or a 2-dimensional comb filter according to the prior art, or used as a motion-detection filter for motion compensation. Thanks to these technologies, high density informations can be extracted from composite signals, without cross-color and degradation in resolution. These technologies can also be applied to future high-definition video signal formats such as HDTV (High-Definition TV).

Now, when a motion appears in the TV frame, some problems such as cross-color, cross-illuminance or blurred edge arise from the 3-dimensional filter with inter-frame signal processing. Therefore, a motion adaptation is carried out, where the conventional 2-dimensional comb filter is used in place, in accordance with the motion in the TV frame. For this motion adaptation, a motion detection circuit for detecting motions between successive TV frames is indispendable. Basically this motion detection is carried out by calculating the difference between successive frames. However, the difference in the treatment of color and illuminance make this signal processing a little bit complex.

FIG. 2 shows an example of the prior art of a video signal processor which functions as the aforementioned motion detection circuit. A signal processing block 1' located at the lefthand side of FIG. 2 and enclosed by broken lines detects the motion. First, signals delayed several pixels, several scanning lines and several fields are fed to registers 3 from terminals IN1 to IN8. Then averaging (interpolation) and subtraction are performed by arithmetic logic units 4. Basically the motion is detected by calculating the difference between successive frames.

The output of this signal processing block 1' is fed to a transversal filter, which is exemplified by a signal processing block 2' located at the righthand side of FIG. 2 and enclosed by broken lines. This filter is used to remove the high-frequency components of the motion signal. Motion signal cannot be used unless it is filtered through the transversal filter 2', which plays an important role.

The circuit of the prior art shown in FIG. 2 is constructed of a number of ALUs, multipliers 5, registers 3, coefficient memories 7, delay memories 6 and so on. The transversal filters 2' uses a large number of components, especially in multipliers 5 and ALUs 4 about 3,000 transistors and about 1,000 transistors respectively, so that the circuit scale is enlarged to raise a problem. One of counter-measures against this problem is a method where multiplyings are performed with a lock-up table using RAMs (i.e., Random Access Memories). Even with this method, however, the number of elements or transistors used per tap of the transversal filter is still as large as about 5,000 so that the filter 2' (having a symmetrical coefficient of eight taps) of FIG. 2 has a circuit with around 40,000 transistors. This number is as large as that of a first generation 16-bit microprocessor. The high definition digital TV receiver uses as many as ten filters of this kind, so that the scale-down of these filter circuits is an important subject.

The prior art described above takes no consideration into the recent progress in the speed of the transistors, as described in the following, so that processing circuits are used without any time multiplex. Therefore the number of transistors used there is too large to implement that video system is a couple of VLSI chips.

As the VLSI fabrication technique progresses, the gate length of a MOS transistor is scaled down so that the device characteristics, especially the gate delay time gets shorter. Consequently, the critical path delay of the signal processing circuits, including multipliers and ALUs are improved. For example, the critical path delay of an 8×8 bit multiplier is about 50 ns with 3 μm $\overline{MOS}$ transistors. This can be shortened to about 12 ns by using 0.8 μm $\overline{MOS}$ transistors. On the contrary, the sampling time of a digital TV system, for example, is constant at 70 ns. The single use of the signal processing circuits for one sampling time is seriously wasteful.

In the example described above, a time multiplex of at least five times can be accomplished to reduce the number of arithmetic logic units to be used to one fifth.

SUMMARY OF THE INVENTION

An object of the present invention is to provide a circuit of a digital video signal processor to be used in systems such as high definition digital TV, efficiently using time multiplexing processes.

The above-specified object can be achieved by a digital video signal processor including a first signal processing core (SPC) for processing a plurality of digital video input signals, the first signal processing core having an $M_{A1}$ number of arithmetic logic units and an $M_{M1}$ number of multipliers; and a second signal processing core having its input responding to the output of the first signal processing core for filtering it, the second signal processing core having an $M_{A2}$ number of arithmetic logic units and an $M_{M2}$ number of multipliers, wherein, in the case where a sampling time shared between said two signal processing cores is designated at T; the processing times of the arithmetic logic units of the two signal processing cores are designated at $\tau_{A1}$ and $\tau_{A2}$, respectively; the processing times of the multipliers of the two signal processing cores are designated at $\tau_{M1}$ and $\tau_{M2}$, respectively; the numbers of program steps of the two signal processing cores are designated $P_1$ and $P_2$, respectively; the numbers of additions and subtractions are designated at $N_{A1}$ and $N_{A2}$, respectively; and the numbers of multiplications are designated at $N_{M1}$ and $N_{M2}$, respectively, the digital video signal processor is time-multiplexed by using the minimum numbers $M_{Ai}$ and $M_{Mi}$ of the arithmetic logic units and the multipliers satisfying the following relations $N_{Ai} \leq P_i \cdot M_{Ai}$, and $N_{Mi} \leq P_i \cdot M_{Mi}$ (i=1, 2); and at the program step $P_i$ satisfying the following relations $\tau_i = \max (\tau_{Ai}, \tau_{Mi})$; and $T/\tau_i \geq P_i$ (i=1, 2).

BRIEF DESCRIPTION OF THE DRAWINGS

FIGS. 1 and 1A are diagrams showing the structures of SPCs according to one embodiment of the present invention;

FIGS. 3 and 4 are diagrams showing the control programs of the SPCs according to the first embodiment of the present invention;

FIGS. 13A and 13B are diagrams showing control programs of the SPC 2A and SPC 2B of the third embodiment of the present invention;

DESCRIPTION OF THE PREFERRED EMBODIMENTS

Embodiment 1

The Embodiment 1 of the present invention will be described in the following with reference to FIGS. 1, 2, 3 and 4.

Figure 2:
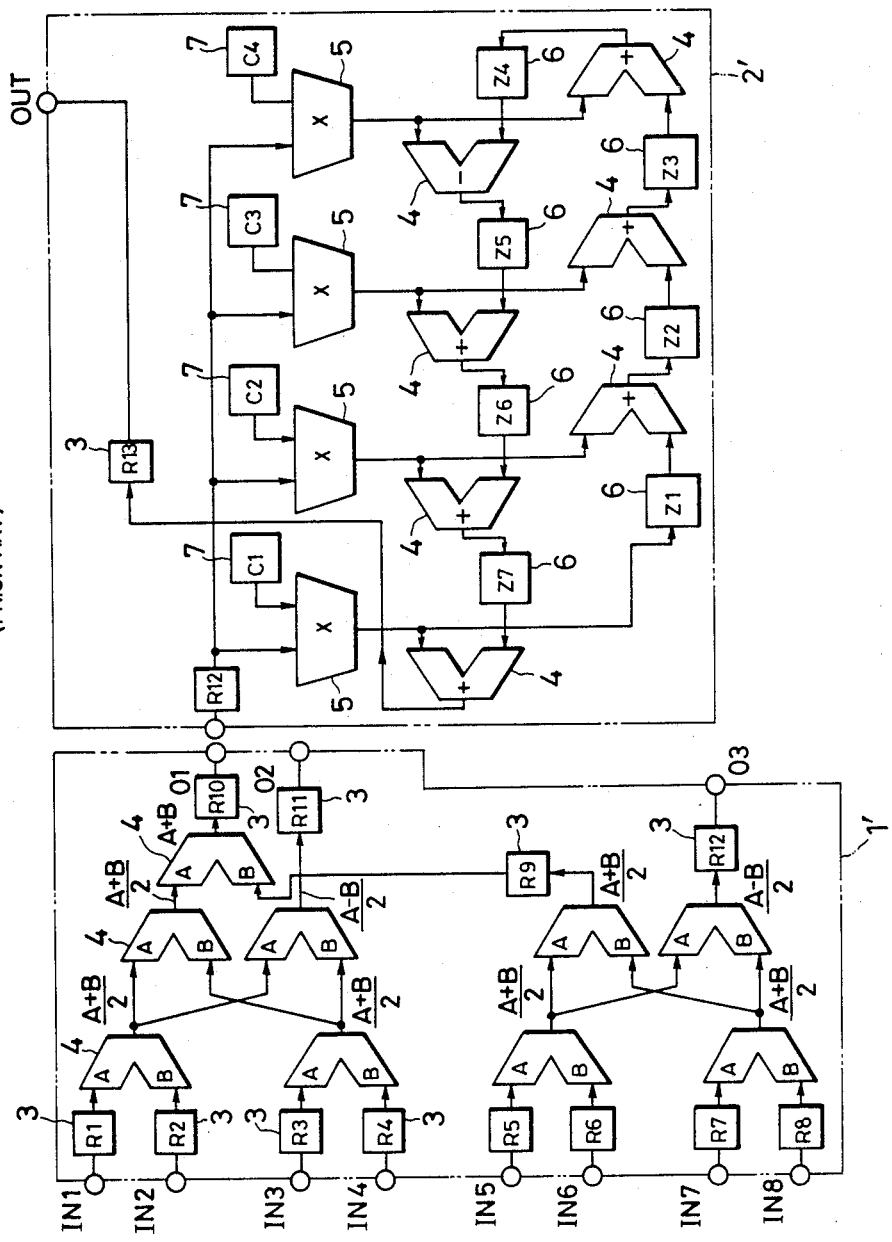
FIG. 2 is a diagram showing the structure of the digital video signal processor according to the prior art.

In the video signal processor of the prior art shown in FIG. 2, the lefthand signal processing block 1' uses nine ALUS 4 whereas the righthand signal processing block 2' uses seven ALUs 4 and four multipliers 5. In other words, the numbers of the ALUs 4, i.e., the numbers of additions and subtractions of the prior art are $N_{A1}=9$ and $N_{A2}=7$, respectively, and the numbers of the multipliers 5, i.e., the numbers of multiplications are $N_{M1}=0$ and $N_{M2}=4$, respectively.

As has been described hereinbefore, on the other hand, the sampling time in the signal processing circuit of the digital TV set is $T=70$ ns, which is common between the two signal processing cores (SPC's). The processing times of each ALU 4 in each SPC are $\tau_{A1}=\tau_{A2}=10$ ns. In the present embodiment, the processing time of each multiplier 5 existing only in the SPC 2 is $\tau_{M2}=12$ ns.

Here, each SPC is constructed in conformity to the above-specified requirements.

At first, from $\tau_i = \max(\tau_{Ai}, \tau_{Mi})$:
$\tau_1 = 10$ ns; and
$\tau_2 = 12$ ns.

From $T/\tau_i \geq P_i$, the numbers of the individual program steps:
$P_1 = 7, 6, 5, ---$; and
$P_2 = 5, 4, 3, ---$.

From $N_{Ai} \leq P_i \cdot M_{Ai}$ and $N_{Mi} \leq P_i \cdot M_{Mi}$, the numbers of the ALUs and multipliers are:
$M_{A1} = 2, 3, ---$, and $M_{M1} = 0$; and
$M_{A2} = 2, 3, ---$, and $M_{M2} = 1, 2, ---$.

As a result, the SPC 1 can be constructed of two ALUs at the least, and the SPC 2 can be constructed of two ALUs and one multiplier at the least.

The structures of the SPC 1 and SPC 2, which are constructed by combining the above-specified numbers of the ALUs and the multiplier with registers, latches, delay memories and coefficient memories, are shown in FIG. 1. These SPC 1 and SPC 2 operate in accordance with the programs shown in FIGS. 3 and 4, respectively.

In FIG. 1: reference numeral 3 designates registers; numeral 4 ALUs; numeral 5 a multiplier; numeral 6 delay memories; numeral 7 a coefficient memory; numeral 8 latches; and numeral 9 data buses.

First of all, a motion detection circuit to be realized by the SPC 1 will be described in connection with instruction executions with reference to FIGS. 1 and 3.

As shown in FIG. 3, program steps in the SPC 1 are performed at rate of $P_1=5$ in relation to the sampling time. Therefore, internal clock for advancing the program is generated by a PLL from the sampling time of $T=70$ ns common between the two SPCs according to a period of $T/5=14$ ns.

At a first step, input signals IN1 to IN8 are latched in registers R1 to R8.

At a second step, the contents of the registers R1 to R4 are latched in latches L1 to L4.

At a third step, the arithmetic results (L1+L2)/2 and (L3+L4)/2 of the ALU4 are latched in the latches L1 and L3, and L2 and L4, respectively.

In FIG. 3 as can be seen from the description above, each row represents a program step and each column represents sequential phases of a program step in which the operation of respective registers, latches, multipliers and ALU's are triggered. Also, as shown above, within each sampling period of 70 ns five program steps are executed. Thus, in FIG. 3, the bold line identifies the phases of each of the program steps executed during a sampling period. The phases within the bold line, when combined, equal five program steps.

Thus, the program advances to the seventh step so that the process performed is equivalent to that of the circuit in FIG. 2.

Since FIG. 1 shows an embodiment of a motion detection circuit embodied in SPC1 which does not require any multipliers other applications of the SPC1 to general signal processing of video signals may require multipliers. For example, element 8A of FIG. 1 may be replaced by element 8A of FIG. 1A having a multiplier 5, coefficient memory C6 and latch L11.

The SPC1 and the SPC2 may also include a phase locked loop 50 for generating a reference signal to be used in the execution of the instructions of the program steps. The phase locked loop 50 is shown in FIG. 1 in phantom (dotted lines).

Next, the transversal filter to be realized by the SPC 2 will be described in the following, in connection with its instructions with reference to FIGS. 1 and 4.

At a first step, as shown in FIG. 4, input data are fed in a latch L6 (i.e., L6=IN). Simultaneously with this, a first coefficient C1 is latched in a latch L5 (i.e., L5=C1) from the coefficient memory 7. Master/slave latches are used here so that the data is latched in response to the first-phase clock $\phi_1$ and appear in response to a second-phase clock $\phi_2$. As a result, the data is fed to the multiplier 5 at the instant when clock $\phi_2$ rises at the latter half of the first program step.

At the second step, the multiplied result is latched in two latches L8 and L10 (i.e., L8=L6*L5, L10*L5). Simultaneously, data to be added thereto are latched in latches L7 and L9 (i.e., L7=Z7, L9=0) from the delay memories 6, respectively. Moreover, a coefficient C2 to be subsequently multiplied is latched in the latch L5.

At the third step, the subsequent multiplied result is latched in the latches L8 and L10. Simultaneously, the added result of the latches L7 and L8 by the arithmetic logic unit 4 is latched in the register R13 (i.e., R13=Z7+L8), and the added result of the latches L9 and L10 is latched in a memory Z1 (i.e., Z1=Z9+L10). Thus, a pipe-line process for executing the multiplication of the present data simultaneously with the addition of the preceding data is used. Moreover, the two adders 4 operate in parallel.

In FIG. 4, each row represents a program step and each column represents sequential phases of the program step in which the operation of one or more registers, latches, multipliers and ALU's are triggered.

In these ways, the program advances to the sixth step of FIG. 4 so that the process is similar to that of the circuit of FIG. 2. Now, because the parallel process is possible, the proceding and succeeding steps can be added to the first and sixth steps so that the sampling interval (e.g., five steps in FIG. 4) can be shortened. Incidentally, Instruction NOP appearing in FIG. 4 designate "No Operation", in which no operation is executed and which is inserted for the synchronization (i.e., five steps/sampling time) with the SPC 1. As a result, the program advances like the SPC 1 in response to the internal clock of 14 ns. In case the SPC 1 and SPC 2 are operated in response to internal clocks which are independent of each other, the NOP can be eliminated to reduce the step number up to a rate of four steps/sampling time.

The internal clock is generated by the PLL in each SPC, synchronized with the common sampling clock in the video system. Therefore, the internal clock may be common or independent for the individual SPCs.

The description thus far made is a general one of the video signal processor using the SPCs according to the present invention. In the present embodiment, the SPC 1 and SPC 2 have the following features because of the motion detections executed in the SPCs and the circuit structure intrinsic to the transversal filter.

First of all, the linear phase transversal filter uses the two adders 4 to operate in parallel. This takes into consideration that after the inputs are multiplied with appropriate filter coefficients by the multiplier 5 its result are used in two additions simultaneously, as shown in FIG. 2. As in this case, the signal processing parallelism can be enhanced to increase the signal processing rate by making an SPC architecture according to the signal processing content.

The SPC 1 of FIG. 1 also adopts the architecture considering the signal processing content. In this SPC 1, the four bus lines 9 are provided to enhance the parallelism of the data flow.

In order to realize the time-multiplexing process in a high-frequency range as in the video band, it is necessary to progress the progressings as many as possible simultaneously at one program step. For this requirement, the following techniques are used in the present embodiment:

(1) The control uses a horizontal micro-program requiring no decoding.

(2) The high speed is realized by the pipe-line processings. For example, the SPC 2 has a three-stage pile-line including the latching, multiplication and addition. Therefore, each latch 8 uses the aforementioned master/slave latch.

(3) The delay memory 6 uses a multi-port memory partly because the data is written at one step in different addresses, as at the step 6 of FIG. 4, and partly because other words are read out, as at the steps 3, 4 and 5 of FIG. 4.

Figure 5:
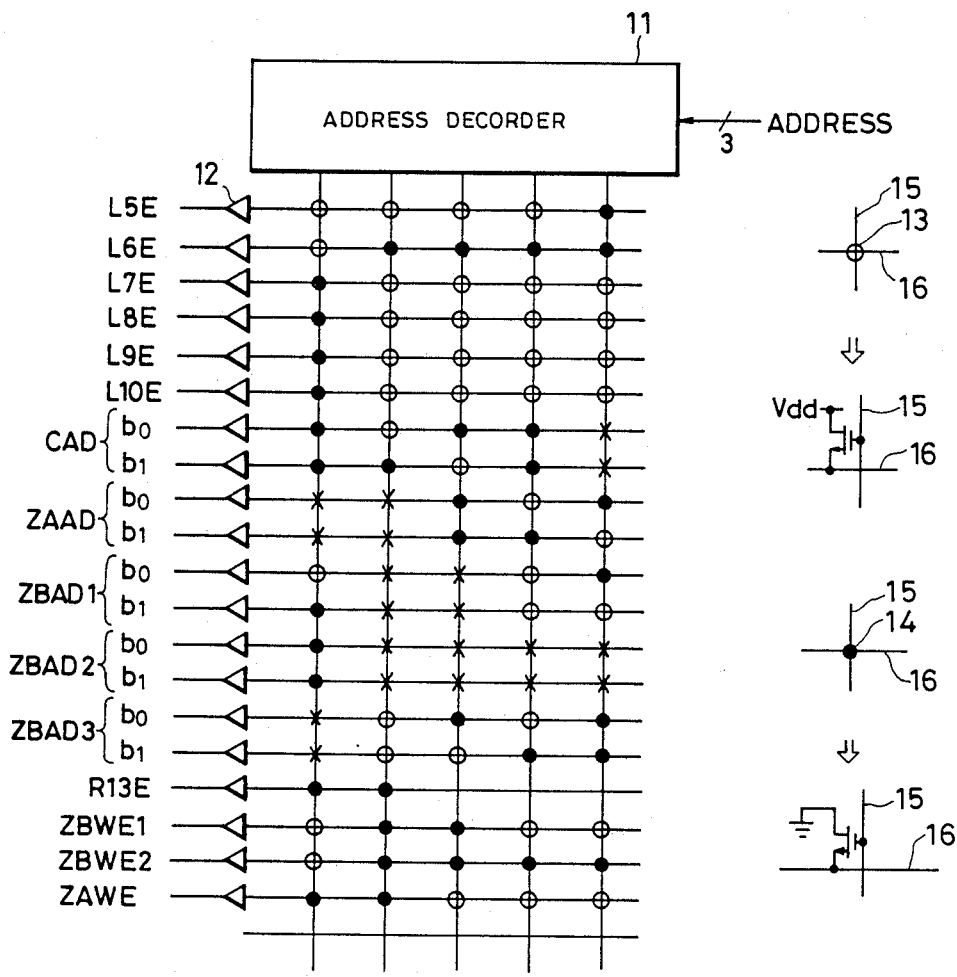
FIG. 5 is a diagram showing a circuit of a program memory of the first embodiment of the present invention.

With reference to FIG. 5, a program memory 10 will be described in the following. FIG. 5 shows the circuit structure of the program memory 10. In FIG. 5: reference numeral 11 designate an address decoder; numeral 12 buffers; numeral 13 "1" level memory cells; numeral 14 "0" level memory cells; numeral 15 word lines; and numeral 16 data lines. On the other hand: reference letters L5E to L10E designate enable signals to be fed to the latches L5 to L10 of FIG. 1, respectively; letters CAD the address of the coefficient memory 7; letters ZAAD the address of delay memories Z1, Z2 and Z3; letters ZAWE a write enable signal of these delay memories; letters ZBAD1, ZBAD2 and ZBAD3 the addresses of delay memories Z4, Z5, Z6 and Z7; letters R13E an enable signal of the output latches; and ZBWE1 and ZBWE2 wrote enable signals of the delay memories Z4, Z5, Z6 and Z7. The stored contents correspond to the object code program of FIG. 4. For a high-speed control, each of the memory cells 13 and 14 has the data line 16 connected directly with a power source $V_{dd}$ or grounded to the earth in accordance with its stored content. Depending on the processing speed requirements and devices, there are other options for these such as static RAMs, fusible PROMs, electrically writable EPROMs or electrically erasable EEPROMs.

Figure 6:
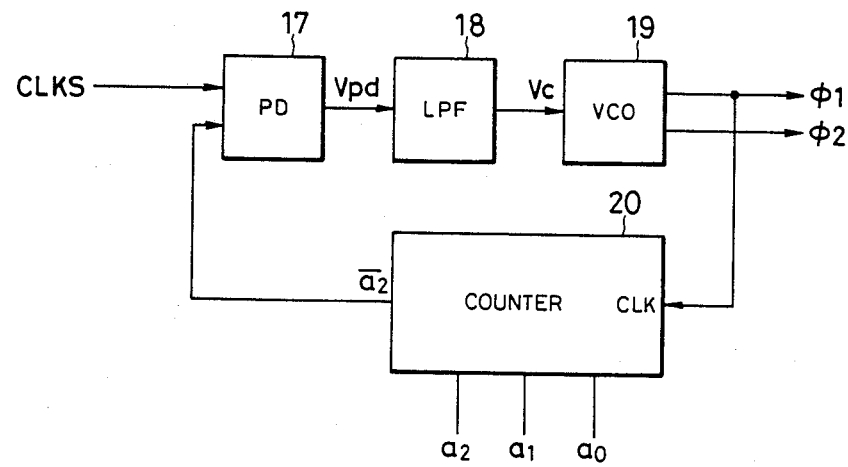
FIG. 6 is a block diagram showing the structure of a circuit of a phase locked loop of the first embodiment of the present invention.
Figure 7:
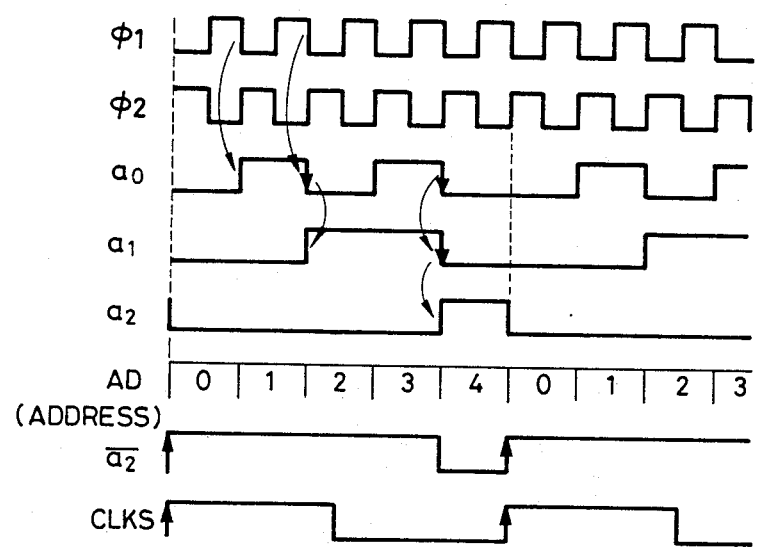
FIG. 7 is a time chart showing the operations of the phase locked loop circuit of the first embodiment of the present invention.

A circuit for generating the addresses of the aforementioned program memories is shown in FIG. 6, and its pulse timings are shown in FIG. 7. When the internal clocks $\phi_1$ and $\phi_2$ have frequencies of 50 MHz or higher, their feeds from the outside become difficult. As shown in FIG. 6, therefore, the internal clocks are generated by a PLL circuit (i.e., Phase Locked loop). A voltage controlled oscillator 19 generates two-phase clocks $\phi_1$ and $\phi_2$, which are counted down by a binary counter 20 which is reset for every 5 counts in accordance with the fifth program step. Here, 3-bit program memory addresses (a0, a1 and a2) are generated. An accurate synchronization is taken by comparing the phases of the counted-down result $\overline{a_2}$ and the sampling clock CLKS of the input signal by means of a phase comparator 17. In order to set the initial state, the aforementioned counter 20 is equipped with a reset terminal or a present terminal and a data input terminal. In FIG. 6, reference numeral 18 designates a low-pass filter. The circuit under consideration is provided either independently in each SPC or commonly for a plurality of SPCs. In either case, the value of the n-notated counter in the PLL circuit can be independently set so that the optimum instruction execution time for each SPC can be set.

Moreover, the clocks $\phi_1$ and $\phi_2$ can be fed from the outside if no problem arises in the speed.

Embodiment 2

In case a number of SPCs are used, it is necessary to set each operation mode and each coefficient and perform the testing reliably and promptly. This necessity can be satisfied by using SPC buses shown in FIGS. 8 and 9.

Figure 8:
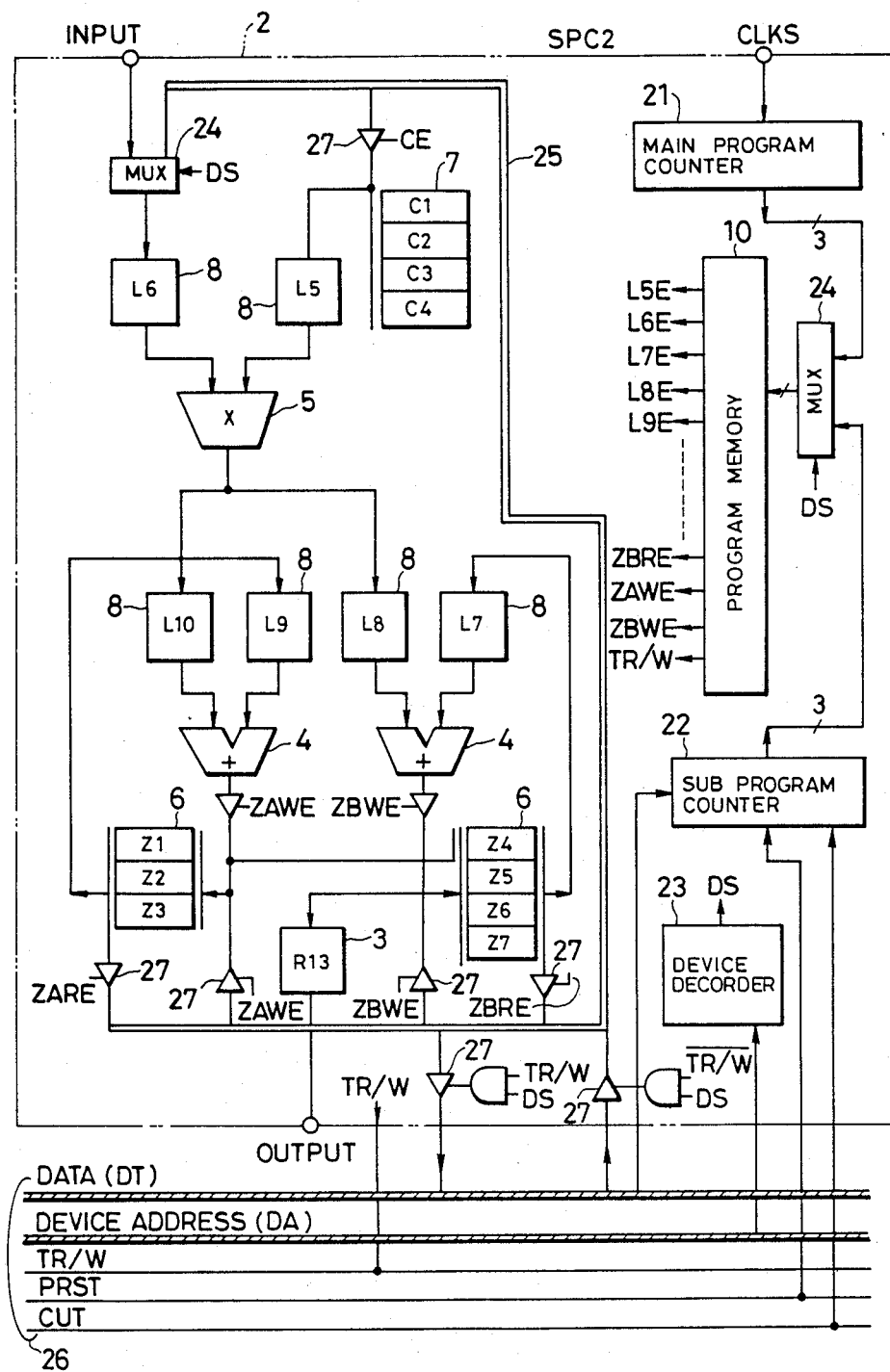
FIG. 8 is a block diagram showing the relations between an SPC and its bus according to the first and second embodiment of the present invention.

FIG. 8 shows the structure of the SPC 2 of FIG. 1 in case the interface with the SPC buses is taken into consideration. First, the device address (DA) from the external SPC bus 26 is decoded by a device decoder 23 of the SPC. If the derive address coincide with the address designated to that SPC, DS (Device Select) signal is issued. Then, the program counter is switched by a multiplexer 24 from a main program counter 21 to a sub program counter 22 which is controlled by an external clock and a preset signal. The program for setting the coefficient of the program memory 10, the operation mode or the testing program is controlled by this sub program counter. In the coefficient setting mode, the data (DT) from the SPC bus 26 are fed through an internal bus 25 to the coefficient memory 7. In the testing mode, input data are first set through the internal bus 25 in the coefficient memory 7, the input latch L6 and the delay memories 6 in order to execute the filtering program of the program memory 10. After this, the processed results stored in the aforementioned individual memories are read out to the SPC bus 26 through the internal bus 25. Reference numeral 27 designates a tri-state gate to be controlled by the individual control signals.

Figure 9:
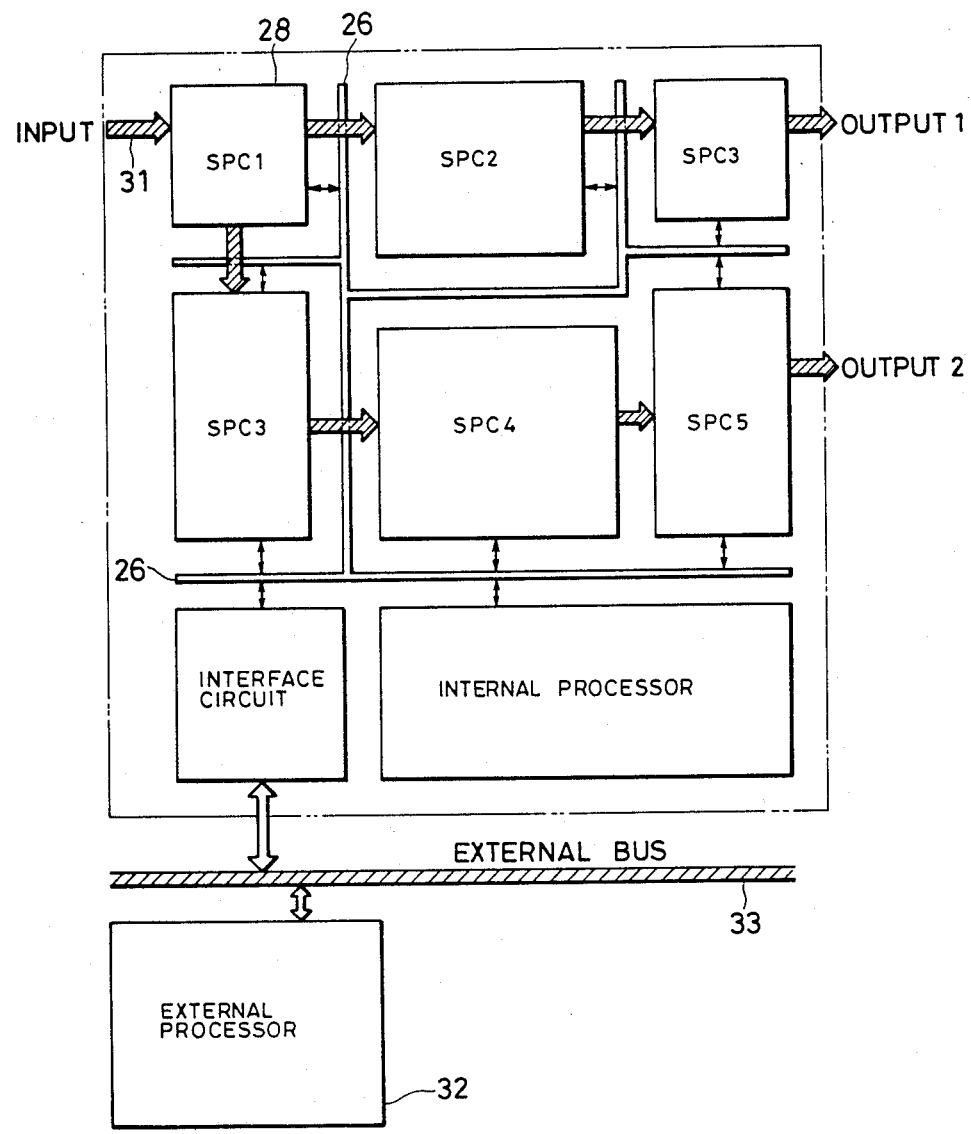
FIG. 9 is a block diagram showing the structure of a VLSI system composed of plural SPCs according to the second embodiment of the present invention.

The VLSI system is arranged with a number of SPCs 28 (i.e., SPC 1 to SPC 5), as shown in FIG. 9. All of these SPCs are controlled either from the outside via the SPC bus 26 through an interface circuit 29 or by an internal processor 30. In FIG. 9, numeral 32 designates an external processor, and numeral 33 designates an external bus. In the ordinary operation, the signals are processed along a high-speed signal path 31 indicated by hatched arrow. In the testing or coefficient and operation mode settings, the interface circuit 29 or the internal processor 30 accesses a specific SPC to carry out those operations. In an adaptive filter, for example, the SPC performs the filtering operation at a high speed, and the internal processor performs complicated adaptation calculations. The coefficients thus calculated are transmitted during a blanking period in the TV scanning to the SPC filter via the aforementioned SPC bus.

Embodiment 3

In this embodiment, the transversal filter in the Embodiment 1 is enhanced, so that setting of the time multiplex degree becomes capable, and filters can be connected in cascade to have variable orders. In order to realize these features this embodiment is equipped with a circuit for setting the number of frequency divisions of a counter in the phase locked loop circuit (PLL) an input signal delay circuit, a circuit to fed external data directly to an ALU, and a circuit for outputting the data to the outside directly from the ALU. The description will proceed with reference to FIG. 10.

The transversal filter of the Embodiment 1 of FIG. 1 is constructed of one SPC 2(2). The transversal filter of the present embodiment is constructed of two SPCs, i.e., SPC 2A(2A) and SPC 2B(2B) which are connected in cascade. A multiplex number N sets the number of frequency divisions of a frequency dividing counter 38 by a multiplex number register 37 and partially changes the content of the program memory 10. Since, moreover, the signal from the preceding stage can be transferred to the register L7 of the ALU 4 by an input switching circuit 35, the SPCs can be connected in cascade. This enables the filter to extend its order to an arbitrary value. Moreover, the program memory 10 and the frequency dividing counter 38 can be set in accordance with the content of the multiplex number register 37 so that the multiplex degree can be set in conformity to the speed required of the system to which the present invention is applied. An input signal delay circuit 34 is provided to ensure a synchronization between the two delays of the output register R13 and the register L7 of the ALU and an input signal even if the two delays come from the cascade connection. Incidentally, FIG. 10 shows the SPC as includes not only the portion indicated at SPC 2 in FIG. 1 but also the program memory shown in FIG. 5 and the PLL portion shown in FIG. 6.

Next, the features of the present embodiment will be described in detail.

Figure 11:
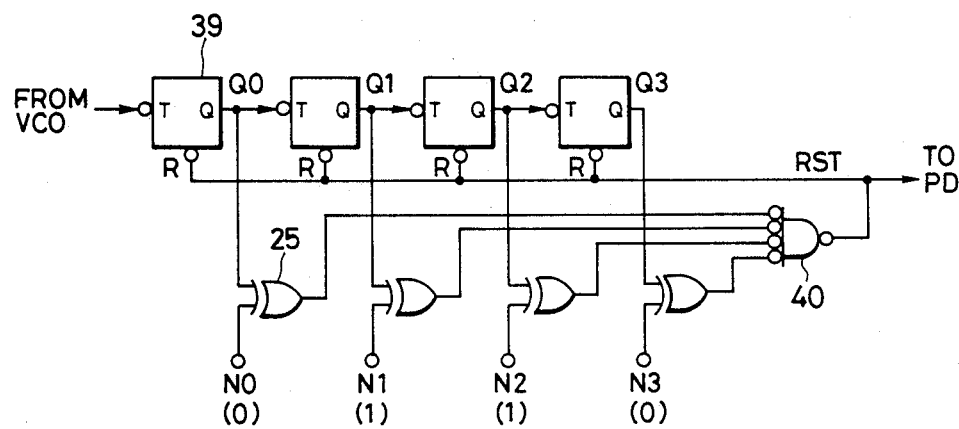
FIG. 11 is a diagram showing a circuit of a frequency dividing counter of the third embodiment of the present invention.
Figure 12:
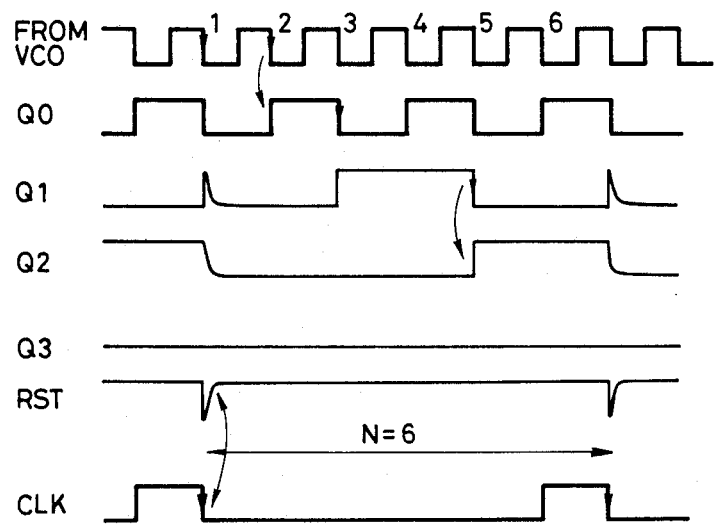
FIG. 12 is a diagram showing the operations of the frequency dividing counter of the third embodiment of the present invention.

The setting of the time multiplex number can be changed by setting the number of frequency divisions of the frequency dividing counter 38 in a PLL circuit 36 by means of a circuit shown in FIG. 11. The timing charts are shown in FIG. 12. A T flip-flop 39 alter the output Q in response to the fall of the input signal T. The output Q is reset by inputting a '0' signal to the reset terminal R. An exclusive OR circuit outputs the logical level 0, when each binary output $Q_1$ of the T flip-flop and a time multiplex number $N_i$ coincide, and resets each T flip-flop 39 through an OR gate 40 at its output terminal only when all the bits coincide. This behavior is shown in FIG. 12. Here, the multiplex degree is set at N=6 or ($N_0$, $N_1$, $N_2$ and $N_3$)=(0 1 1 0) in the binary notation. In the reset signal RST, there appear pulses from the voltage controlled oscillator VCO, which are compared for synchronization with the external CL. The present signal processor can be used six times time-multiplexly by using the output of the VCO as the control clocks. As a result, the number of frequency divisions of the counter and the time multiplex degree can be changed by setting the value of the time multiplex degree N.

Figure 10:
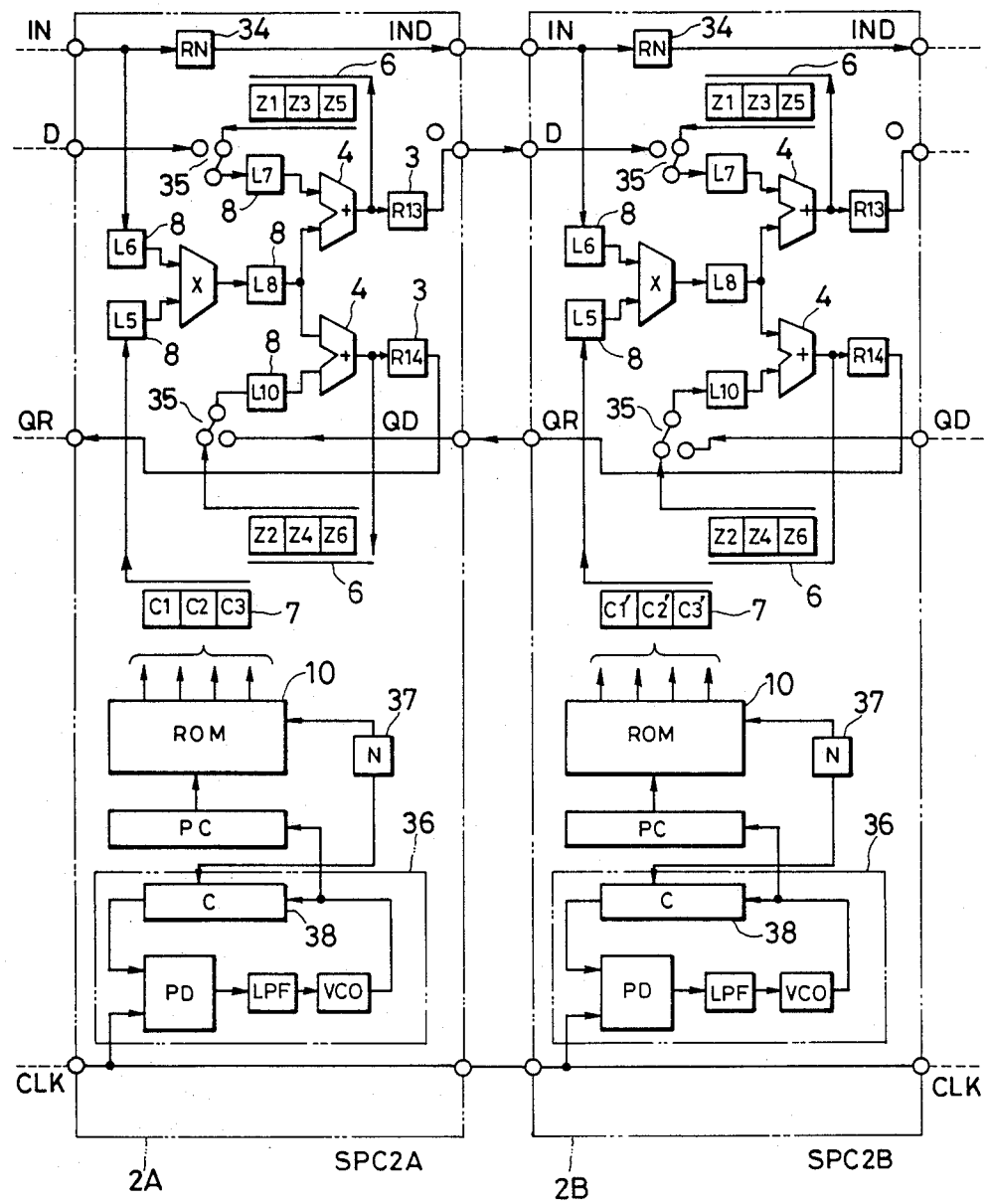
FIG. 10 is a diagram showing the structure of SPCs according to a third embodiment of the present invention.
Figure 13A:
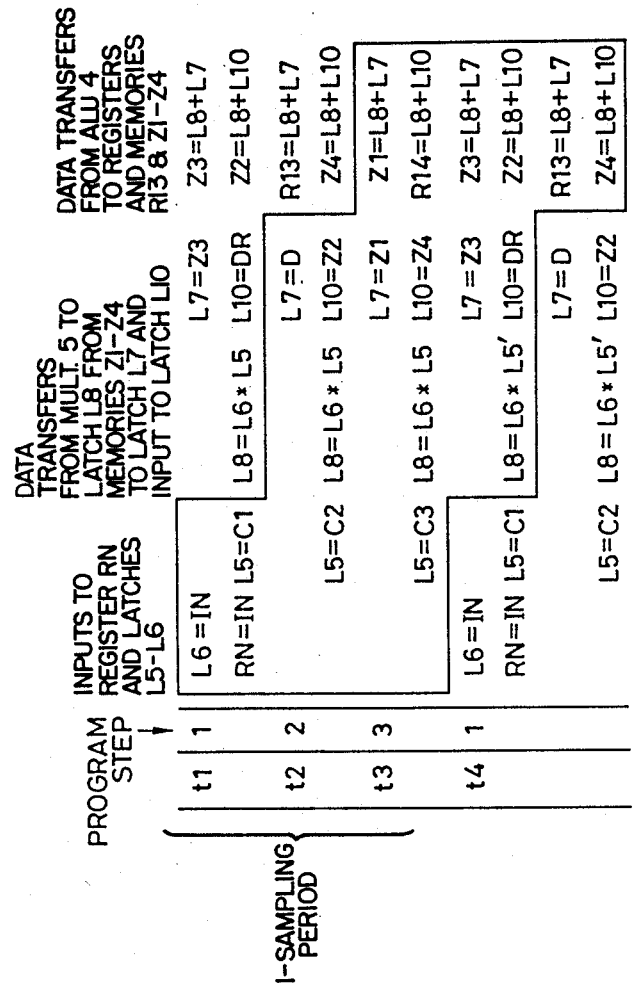
Figure 14:
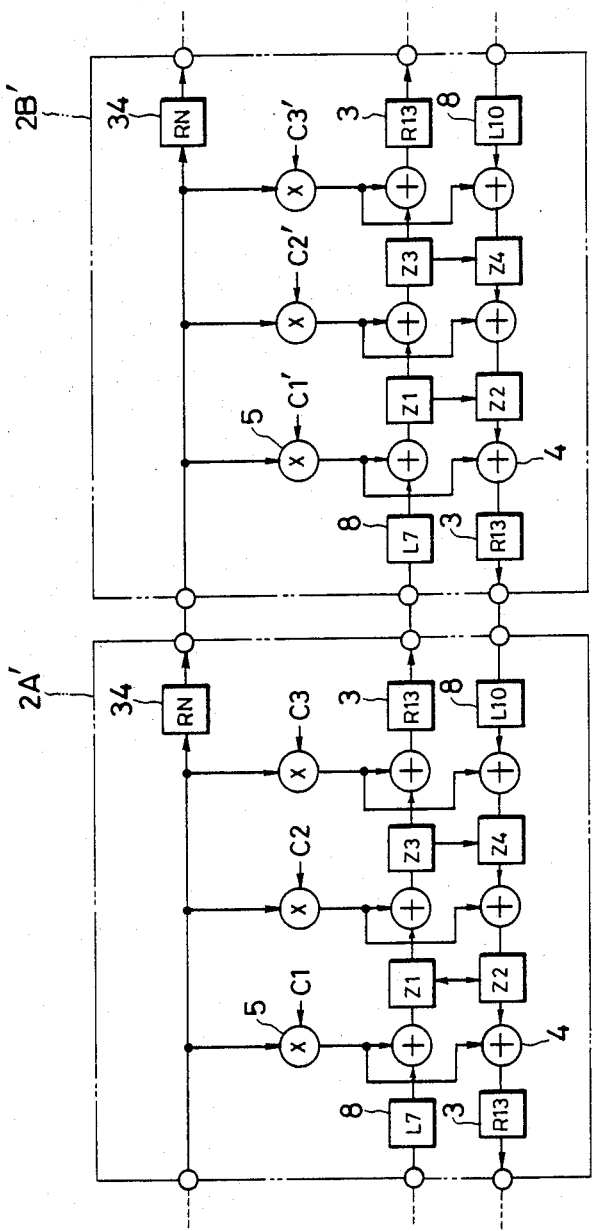
FIG. 14 is a diagram showing the structure of the prior art corresponding to the third embodiment of the present invention.

The circuit shown in FIG. 10 can be operated like the filter shown in FIG. 14 if it follows the programs shown in FIGS. 13A and 13B.

As in FIGS. 3 and 4, the rows represent program steps, the columns represent phases of the program steps in which respective devices are triggered to operate and the bold lines enclose the portions of the program steps executed in one sampling period. Two directions of signal flow are present in FIG. 14. One is a rightward signal flow of L7—Z1—Z3—R13 and the other is a leftward signal flow of L10—Z4—Z2—Z13. This is because the individual filter coefficients of the signals to be sequentially added are set at C1, C2, C3, - - - , and C3, C2, C1 by folding back the rightward signals leftward after they have passed through a predetermined number of steps of filters. By making the orders of the individuals coefficients thus symmetric, an equal group delay can be given to the input signals of all frequencies.

Embodiment 4

This embodiment is modified from the transversal filter of the Embodiment 4 such that not only the tap coefficients but also the delay between each filter tap can be set. This filter circuit is appropriate for a ghost canceller circuit of a TV receiver or the like.

Figure 15:
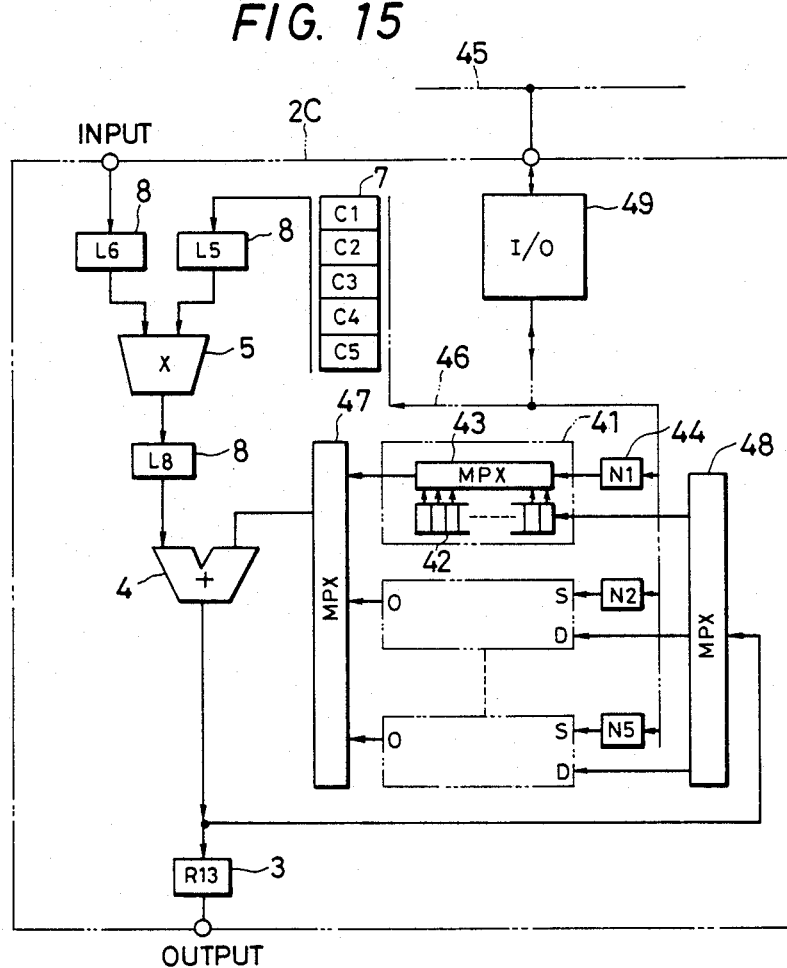
FIG. 15 is a diagram showing the structure of an SPC according to a fourth embodiment of the present invention.

FIG. 15 shows the structure of the SPC of the filter portion of the present embodiment. Each variable delay circuit 41 is constructed of: a shift register 42 for operating in synchronism with a sampling clock; a multiplexer 43 for selecting the outputs of the shift register; and a delay number register 44 for latching the delay number. The amount of delay of each delay circuit is set like the filter tap coefficient through a data bus 45. The filter tap coefficient is latched in the coefficient memory 7. Moreover: letter 8 designates registers; numeral 46 an internal data bus; numeral 47 a delay circuit output multiplexer; numeral 48 an extension circuit input multiplexer; and numeral 49 an interface circuit (I/O). The coefficient memory 7 latches the filter tap coefficients for five taps. The present embodiment is featured by the fact that the variable delay circuits 41 are used as registers for latching delay data.

Figure 16:
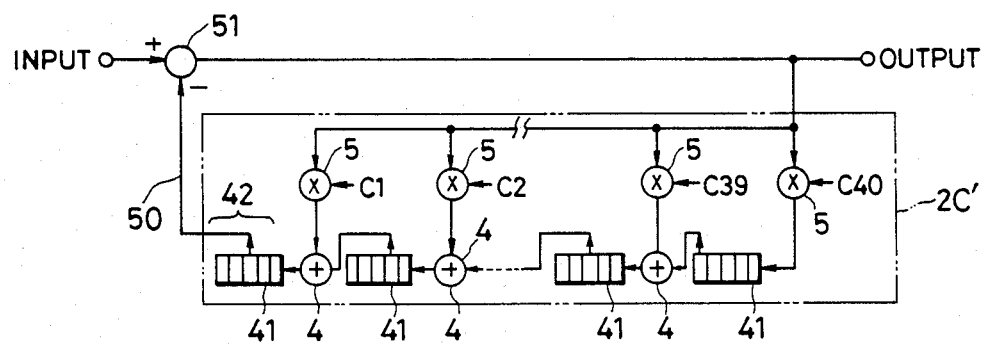
FIG. 16 is a diagram showing the structure of a ghost canceller using a circuit using no time multiplex corresponding to the fourth embodiment of the present invention.

According to the filter circuit using the SPC of this embodiment as shown in FIG. 15, a filter circuit shown in FIG. 16 can be realized with a small number of elements. The filter circuit of FIG. 16 is a ghost canceller for eliminating the ghost from by substracting the ghost signal synthesized by the filter from a ghost containing signal coming from the input terminal.

The number of elements in the digital signal processor is reduced by the process of present invention so that an analog/digital (A/D) converter, a digital/analog (i.e., D/A) converter and so on can be integrated on a common single chip.

Figure 17:
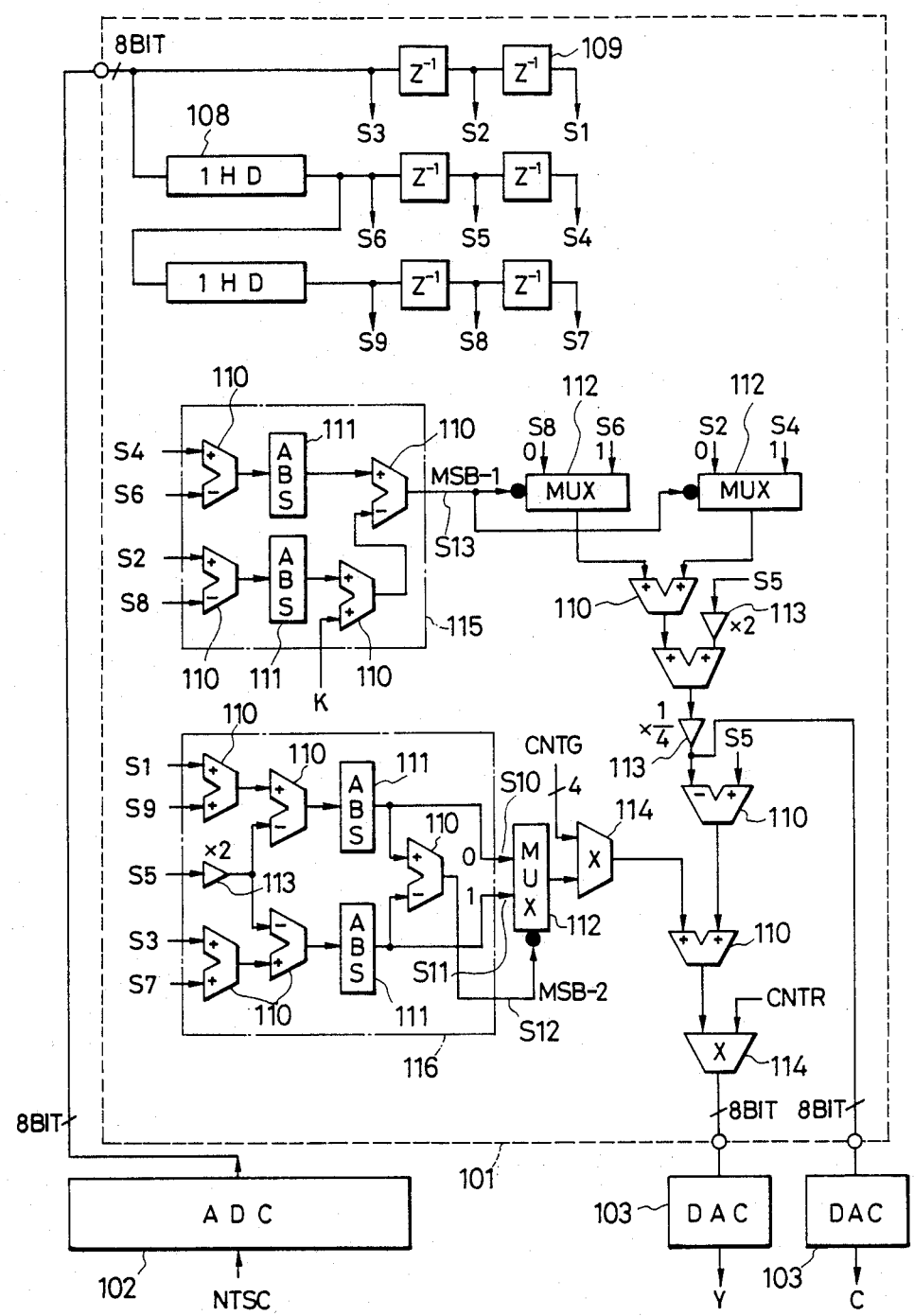
FIG. 17 is a circuit diagram showing a digital signal processor according to the prior art.

FIG. 17 shows a circuit example of the digital signal processor of the prior art not using the process of the present invention, as has been reported on pp. 152 and 153, ISSCC "Digest of Technical Papers", 1986. This circuit separates an illuminance signal Y and a chrominance signal C from the NTSC composite video signal of a television system. The operations of this circuit will be described briefly in the following.

An analog NTSC signal is converted into a 8-bit digital signal by an A/D converter 102 and as inputted to a digital signal processor 101. This digital signal is delayed a predetermined amount by line memories 108 and a delay memory 109 until it is fed as signals S1 to S9 to a signal difference estimator 15 or a differential estimator 116. Reference numerals 110, 111 and 113 designate an ALU, an absolute value circuit, and a coefficient circuit, respectively. The outputs of these signal difference estimator 115 and differential estimator 116 becomes the control signal for the adaptative Y/C separation and fed to multiplexers 112. According to these control signals, the NTSC composite signal is separated adaptively into 8-bit digital illuminance and chrominance signals, and are outputted from the digital signal processor 101 so that they are converted into analog illuminance and chrominance signals Y and C.

Figure 18:
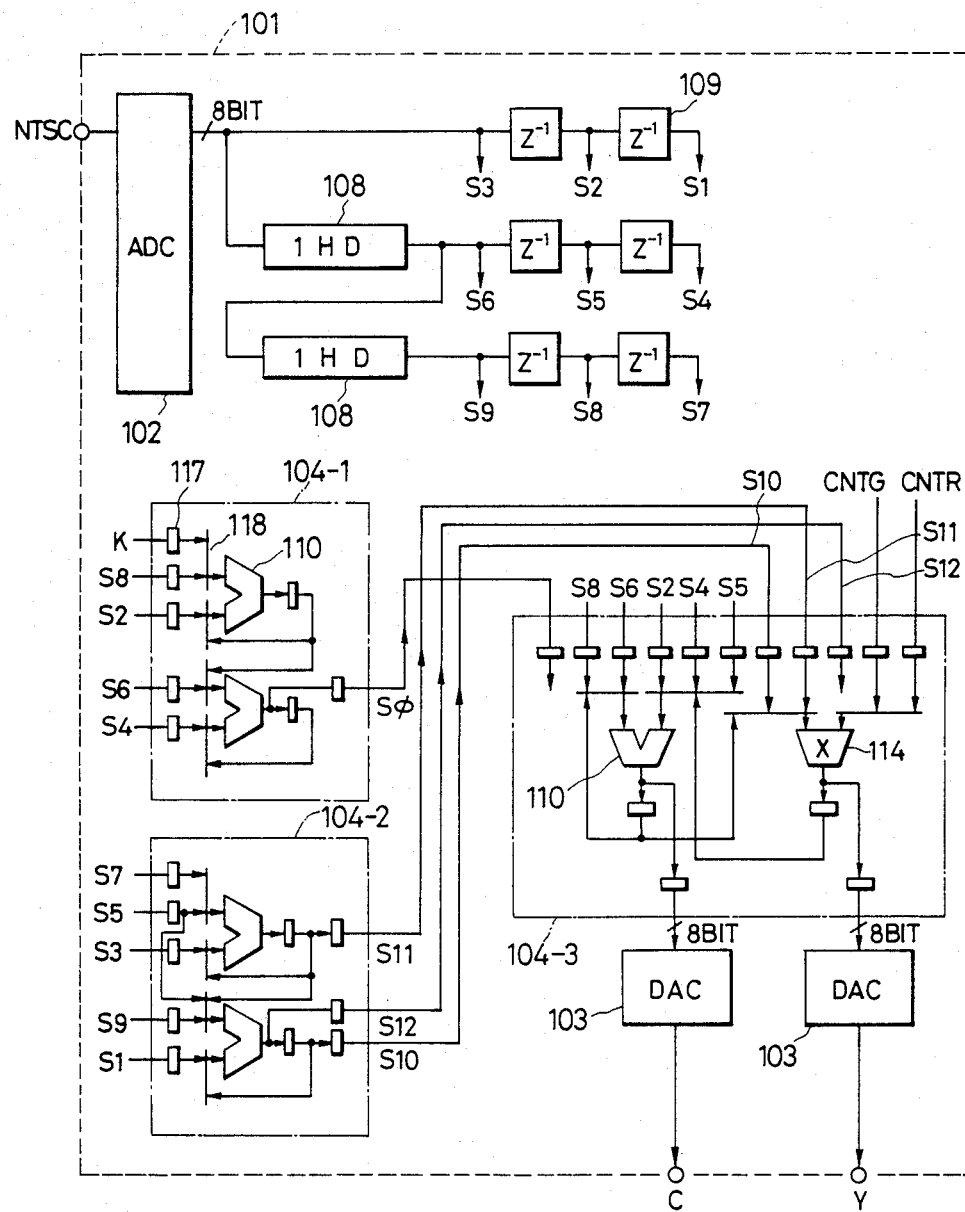
FIG. 18 is a circuit diagram showing an example of the digital signal processor according to the present invention, in which an A/D converter and a D/A converter are integrated together on a common single chip.

If this digital signal processor is designed by the technology based on the present invention, the number of circuit elements of the digital signal processor can be drastically reduced so that the A/D converter and the D/A converter can be integrated on the chip shared with the digital signal processor by making use of the reduced space on the chip, as shown in FIG. 18.

In FIG. 18, reference numerals 104-1, 104-2 and 104-3 designate the individual portions of the digital signal processor, in which the number of elements is reduced by the process of the present invention. Numerals 117 and 118 designate a register and a bus line, respectively. The A/D converter 102 and D/A converter 103 are integrated on the chip shared with the digital signal processor by making use of the space which is established by reducing the element number. The number of signal input pin is only one for the analog NTSC and only two for the analog Y and C, so that the number of pins, and consequently the price of the package can be reduced drastically.

What is claimed is:

1. A digital video signal processor comprising:
   (1) a first signal processing core for processing a plurality of digital video signals, said first signal processing core having an $M_{A1}$ number of arithmetic logic units and an $M_{M1}$ number of multipliers; and
   (2) a second signal processing core having its input responding to an output of said first signal processing core for filtering said output of said first signal processing core, said second signal processing core having an $M_{A2}$ number of arithmetic logic units and an $M_{M2}$ number of multipliers,
   wherein, a sampling time shared between said first and second signal processing cores is designated as T;
   processing times of said arithmetic logic units of said first and second signal processing cores are designated as $\tau_{A1}$ and $\tau_{A2}$, respectively;
   processing times of said multipliers of said first and second signal processing cores are designated as $\tau_{M1}$ and $\tau_{M2}$, respectively;
   a number of program steps of said first and second signal processing cores are designated as $P_1$ and $P_2$, respectively;
   a number of additions and subtractions of said first and second signal processing cores are designated as $N_{A1}$ and $N_{A2}$, respectively; and
   a number of multiplications of said first and second signal processing cores are designated as $N_{M1}$ and $N_{M2}$, respectively, and wherein said digital video signal processor is time-multiplexed by using numbers $M_{A1}$ and $M_{M2}$ of said arithmetic logic units and said multipliers respectively, wherein the following relations are satisfied $$N_{Ai} \leq P_i M_{Ai},$$

and $$N_{Mi} \leq P_i M_{Mi} (i=1, 2); \text{ and}$$

at program step $P_i$ the following relations are satisfied $$\tau_i = \max(\tau_{Ai}, \tau_{Mi});$$

and $$T/\tau_i \geq P_i (i=1, 2).$$

2. A digital video signal processor as defined in claim 1, wherein said each of said signal processing cores has a phase locked loop for generating a reference signal for instruction execution.

3. A digital video signal processor as defined in claim 2, wherein said second signal processing core has delay circuits each for delaying an input signal, a circuit for latching an external signal directly in said arithmetic logic units, a circuit for extracting the outputs of said arithmetic logic units directly to the outside, and means for setting the number of frequency divisions of a counter in said phase locked loop.

4. A digital video signal processor as defined in claim 1, wherein said second signal processing core has its delay circuits enabled to have the delay times set independently of one another.

* * * * *